US009995174B2

(12) United States Patent
McCune et al.

(10) Patent No.: US 9,995,174 B2
(45) Date of Patent: Jun. 12, 2018

(54) PLANETARY GEAR SYSTEM ARRANGEMENT WITH AUXILIARY OIL SYSTEM (75) Inventors: Michael E. McCune, Colchester, CT (US); William G. Sheridan, Southington, CT (US); Lawrence E. Portlock, Bethany, CT (US)

(73) Assignee: United Technologies Corporation, Hartford, CT (US)

( * ) Notice: Subject to any disclaimer, the term of this patent is extended or adjusted under 35 U.S.C. 154(b) by 1811 days.

(21) Appl. No.: 13/428,491

(22) Filed: Mar. 23, 2012

(65) Prior Publication Data

US 2012/0192570 A1 Aug. 2, 2012

Related U.S. Application Data (63) Continuation-in-part of application No. 12/902,525, filed on Oct. 12, 2010, now Pat. No. 8,813,469.

(51) Int. Cl.
*F01D 25/18* (2006.01)
*F01D 25/16* (2006.01)
*F02C 3/10* (2006.01)
*F02C 7/36* (2006.01)
*F02K 3/06* (2006.01)
(Continued)

(52) U.S. Cl.
CPC ............ *F01D 25/16* (2013.01); *F01D 25/18* (2013.01); *F02C 3/10* (2013.01); *F02C 7/06* (2013.01); *F02C 7/10* (2013.01); *F02C 7/36* (2013.01); *F02K 3/06* (2013.01); *F05D 2260/40311* (2013.01); *F16N 7/34* (2013.01); *Y02T 50/671* (2013.01); *Y10T 29/4932* (2015.01)

(58) Field of Classification Search
CPC ...... F02C 3/10; F02C 7/06; F02C 7/36; F01D 25/18; F02K 3/06
See application file for complete search history.

(56) References Cited

U.S. PATENT DOCUMENTS 2,591,743 A 4/1952 Thompson
2,684,591 A 7/1954 Lundquist
(Continued)

FOREIGN PATENT DOCUMENTS

CN 1707070 A 12/2005
CN 201277153 Y 7/2009
(Continued)

OTHER PUBLICATIONS

International Preliminary Report on Patentability for International Application No. PCT/US2013/033207 dated Oct. 2, 2014.
(Continued)

*Primary Examiner* — Arun Goyal
(74) *Attorney, Agent, or Firm* — Carlson, Gaskey & Olds, P.C.

(57) ABSTRACT

A gas turbine engine has a fan, first and second compressor stages, first and second turbine stages. The first turbine stage drives the second compressor stage as a high spool. The second turbine stage drives the first compressor stage as part of a low spool. A gear train drives the fan with the low spool, such that the fan and first compressor stage rotate in the same direction. The high spool operates at higher pressures than the low spool. A lubrication system is also disclosed.

18 Claims, 6 Drawing Sheets (51) Int. Cl.
  *F02C 7/06*    (2006.01)
  *F02C 7/10*    (2006.01)
  *F16N 7/34*    (2006.01)

(56) References Cited

U.S. PATENT DOCUMENTS

| | | | |
|---|---|---|---|
| 2,703,021 A | 3/1955 | Stoeckicht | |
| 2,749,778 A | 6/1956 | Kuhn | |
| 2,830,473 A | 4/1958 | Brown | |
| 2,883,885 A | 4/1959 | Upton | |
| 2,968,922 A | 1/1961 | Gilbert | |
| 3,160,026 A | 12/1964 | Rosen | |
| 3,287,906 A | 11/1966 | McCormick | |
| 3,307,433 A | 3/1967 | Bennett et al. | |
| 3,352,178 A | 11/1967 | Lindgren et al. | |
| 3,459,072 A | 8/1969 | Shannon | |
| 3,650,353 A | 3/1972 | Abbott | |
| 3,754,484 A | 8/1973 | Roberts | |
| 3,776,067 A | 12/1973 | DeBruyne et al. | |
| 3,960,029 A | 6/1976 | Eichinger | |
| 4,050,544 A | 9/1977 | Kalyan et al. | |
| 4,227,427 A | 10/1980 | Dick | |
| 4,271,928 A | 6/1981 | Northern | |
| 4,378,711 A | 4/1983 | Daniel | |
| 4,438,663 A | 3/1984 | Eichenberger et al. | |
| 4,455,888 A | 6/1984 | Wayman et al. | |
| 4,467,670 A | 8/1984 | Kawamoto | |
| 4,528,870 A | 7/1985 | Van Deursen et al. | |
| 4,583,413 A | 4/1986 | Lack | |
| 4,657,410 A | 4/1987 | Hibner | |
| 4,784,018 A | 11/1988 | Okada et al. | |
| 4,950,213 A | 8/1990 | Morisawa | |
| 5,058,452 A | 10/1991 | El-Shafei | |
| 5,102,379 A | 4/1992 | Pagluica et al. | |
| 5,433,674 A | 7/1995 | Sheridan et al. | |
| 5,466,198 A | 11/1995 | McKibbin et al. | |
| 5,472,059 A | 12/1995 | Schlosser et al. | |
| 5,472,383 A | 12/1995 | McKibbin | |
| 5,643,126 A | 7/1997 | Hotta et al. | |
| 5,685,797 A | 11/1997 | Barnsby et al. | |
| 5,830,098 A | 11/1998 | Kimes | |
| 5,915,917 A | 6/1999 | Eveker et al. | |
| 6,223,616 B1 | 5/2001 | Sheridan | |
| 7,704,178 B2 | 4/2010 | Sheridan et al. | |
| 8,205,432 B2* | 6/2012 | Sheridan | 60/226.3 |
| 8,484,942 B1* | 7/2013 | McCune et al. | 60/39.08 |
| 8,813,469 B2* | 8/2014 | Sheridan | 60/39.08 |
| 8,931,285 B2* | 1/2015 | McCune et al. | 60/792 |
| 2007/0240399 A1 | 10/2007 | Orlando et al. | |
| 2008/0044276 A1 | 2/2008 | McCune et al. | |
| 2009/0090096 A1 | 4/2009 | Sheridan | |
| 2009/0188334 A1 | 7/2009 | Merry et al. | |
| 2010/0105516 A1 | 4/2010 | Sheridan et al. | |
| 2010/0148396 A1 | 6/2010 | Xie et al. | |
| 2010/0154217 A1 | 6/2010 | Sheridan et al. | |
| 2010/0160105 A1 | 6/2010 | Sheridan et al. | |
| 2010/0212281 A1* | 8/2010 | Sheridan | 60/39.08 |
| 2010/0317478 A1 | 12/2010 | McCune et al. | |
| 2010/0331139 A1 | 12/2010 | McCune | |

FOREIGN PATENT DOCUMENTS

| | | |
|---|---|---|
| EP | 2264336 A1 | 12/2010 |
| EP | 2267338 A1 | 12/2010 |
| EP | 2270361 A2 | 1/2011 |
| EP | 2327859 A2 | 6/2011 |
| EP | 2333250 A2 | 6/2011 |
| GB | 1516041 | 6/1978 |
| GB | 2041090 | 9/1980 |
| JP | S57161326 A | 10/1982 |
| JP | 60252857 | 12/1985 |
| JP | 61130656 | 6/1986 |
| JP | 62166365 | 7/1987 |
| JP | 2003056362 A | 2/2003 |
| WO | 2007038674 | 4/2007 |

OTHER PUBLICATIONS

European Search Report, dated Mar. 18, 2014.

International Search Report and Written Opinion for International Application No. PCT/US2013/033207 completed on Jan. 22, 2014.

Singapore Search Report and Written Opinion for Singapore Application No. 11201404964X dated Apr. 20, 2015.

Supplementary European Search Report for European Application No. 13817296.0 dated Feb. 12, 2016.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-151.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

(56) References Cited

OTHER PUBLICATIONS

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

\* cited by examiner

PLANETARY GEAR SYSTEM ARRANGEMENT WITH AUXILIARY OIL SYSTEM

CROSS-REFERENCE TO RELATED APPLICATION

This application is a continuation-in-part application of U.S. Ser. No. 12/902,525, filed Oct. 12, 2010 now U.S. Pat. No. 8,813,469.

FIELD

This invention relates to planetary gear trains and more particularly to a lubricating system for a planetary gear train.

BACKGROUND

Planetary gear trains are complex mechanisms that reduce, or occasionally increase, the rotational speed between two rotating shafts or rotors. The compactness of planetary gear trains makes them appealing for use in aircraft engines where space is at a premium.

The forces and torque transferred through a planetary gear train place stresses on the gear train components that may make them susceptible to breakage and wear. In practice, conditions may be less than ideal and place additional stresses on the gear components. For example the longitudinal axes of a planetary gear train's sun gear, planet carrier, and ring gear are ideally coaxial with the longitudinal axis of an external shaft that rotates the sun gear. Such perfect coaxial alignment, however, is rare due to numerous factors including imbalances in rotating hardware, manufacturing imperfections, and transient flexure of shafts and support frames due to aircraft maneuvers. The resulting parallel and angular misalignments impose moments and forces on the gear teeth, the bearings which support the planet gears in their carrier, and the carrier itself. These imposed forces and moments may cause gear component wear and increase a likelihood that a component may break in service. Component breakage is undesirable in any application, but particularly so in an aircraft engine. Moreover, component wear necessitates inspections and part replacements which may render the engine and aircraft uneconomical to operate.

The risk of component breakage may be reduced by making the gear train components larger and therefore stronger. Increased size may also reduce wear by distributing the transmitted forces over correspondingly larger surfaces. However increased size offsets the compactness that makes planetary gear trains appealing for use in aircraft engines, and the corresponding weight increase is similarly undesirable. The use of high strength materials and wear resistant coatings can also be beneficial, but escalates the cost of the gear train and therefore does not diminish the desire to reduce wear.

Stresses due to misalignments can also be reduced by the use of flexible couplings to connect the gear train to external devices such as rotating shafts or non-rotating supports. For example, a flexible coupling connecting a sun gear to a drive shaft flexes so that the sun gear remains near its ideal orientation with respect to the mating planet gears even though the axis of the shaft is oblique or displaced with respect to a perfectly aligned orientation. Many prior art couplings, however, contain multiple parts that require lubrication and are themselves susceptible to wear. Prior art couplings may also lack adequate rigidity and strength, with respect to torsion about a longitudinal axis, to be useful in high torque applications.

SUMMARY

In a featured embodiment, a gas turbine engine has a fan, a first compressor stage and a second compressor stage. The first turbine stage drives the second compressor stage as a high spool. The second turbine stage drives the first compressor stage as part of a low spool. A gear train drives the fan with the low spool, such that the fan and first compressor stage rotate in the same direction. The high spool operates at higher pressures than the low spool.

In another embodiment according to the previous embodiment, a gear train has a planetary gear, a sun gear, a stationary ring gear, and a carrier in which the planetary gear is mounted. The carrier is mounted for rotation about the sun gear and drives the fan.

In another embodiment according to the previous embodiment, a lubricating system is provided for the gear train.

In another embodiment according to the previous embodiment, the lubricating system includes a lubricant input, there being a stationary first bearing receiving lubricant from the lubricant input. The first bearing has an inner first race in which lubricant flows, and a second bearing for rotation within the first bearing. The second bearing has a first opening in registration with the inner first race such that lubricant may flow from the inner first race through the first opening into a first conduit.

In another embodiment according to the previous embodiment, a rotating carrier supports a planetary gear wherein the second bearing extends from the rotating carrier about an axis.

In another embodiment according to the previous embodiment, the first conduit lubricates the planetary gears.

In another embodiment according to the previous embodiment, a first spray bar is disposed on the carrier.

In another embodiment according to the previous embodiment, the ring gear has a recess.

In another embodiment according to the previous embodiment, the recess is radially outward of gear teeth on the ring gear.

In another embodiment according to the previous embodiment, the recess is formed by recess portions formed in each of two gear portions which together form the ring gear.

In another embodiment according to the previous embodiment, the fan rotates slower than the first compressor stage.

In another featured embodiment, a gas turbine engine has a fan, a first compressor rotor and a second compressor rotor. The first turbine rotor drives the second compressor rotor as a high spool. The second turbine rotor drives the first compressor rotor as part of a low spool. A gear reduction drives the fan with the low spool at a reduced speed, such that the fan and first compressor rotor rotate in the same direction. The high spool operates at higher pressures than the low spool. A lubrication system lubricates components across a rotation gap. The lubrication system includes a lubricant input, a stationary first bearing receiving lubricant from the lubricant input, and an inner first race in which lubricant flows, and a second bearing for rotation within the first bearing. The second bearing has a first opening in registration with the inner first race such that lubricant may flow from the inner first race through the first opening into a first conduit.

In another embodiment according to the previous embodiment, said first bearing and said second bearing are disposed about an axis.

In another embodiment according to the previous embodiment, the first conduit and the opening are perpendicular to the axis.

In another embodiment according to the previous embodiment, a rotating carrier supports a planetary gear wherein the second bearing extends from the rotating carrier about an axis.

In another embodiment according to the previous embodiment, the first conduit is parallel to the axis and the first opening is perpendicular to the axis.

In another embodiment according to the previous embodiment, the first conduit lubricates the planetary gears.

In another embodiment according to the previous embodiment, a first spray bar disposed on the carrier.

In another embodiment according to the previous embodiment, the first bearing has a second inner race. The second bearing has a second opening in registration with the second inner race and a second conduit for passing lubricant to the spray bar.

In another embodiment according to the previous embodiment, the fan rotates slower than the first compressor stage.

In a further featured embodiment, a gas turbine engine has a fan, a first compressor stage and a second compressor stage. The first turbine stage drives the second compressor stage as a high spool. The second turbine stage drives the first compressor stage as part of a low spool. A gear train drives the fan with the low spool, such that the fan and first compressor stage rotate in the same direction. The high spool operates at higher pressures than the low spool. The gear train has a planetary gear, a sun gear, a stationary ring gear, and a carrier in which the planetary gear is mounted. The carrier is mounted for rotation about the said sun gear and drives the fan. A lubricating system is provided for the gear train. The ring gear has a recess radially outward of gear teeth on the ring gear.

In another embodiment according to the previous embodiment, the recess is formed by recess portions formed in each of two gear portions which together form the ring gear.

In another embodiment according to the previous embodiment, the fan rotates slower than the first compressor stage.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
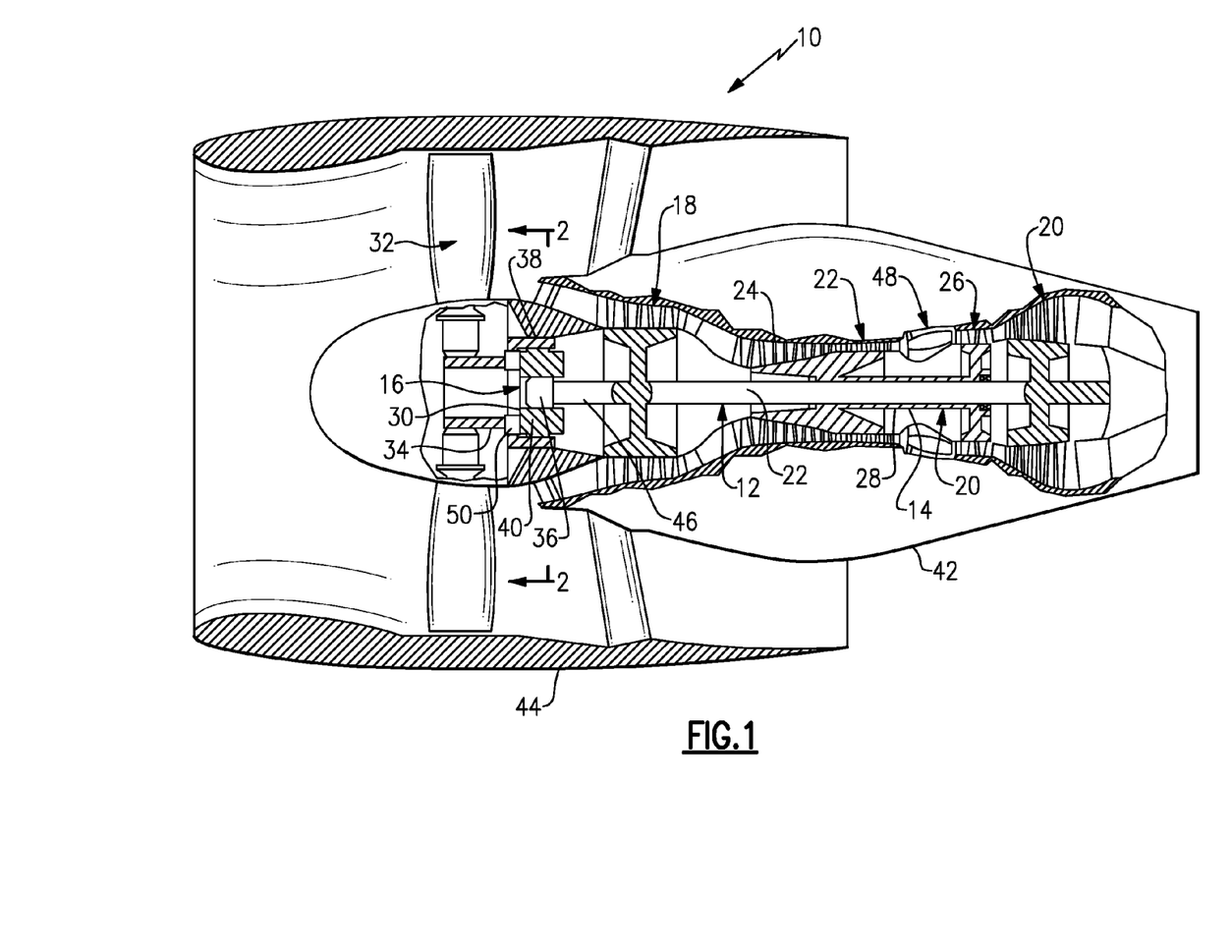
FIG. 1 is a schematic view, partially in section, of a gas turbine engine.

FIG. 1 shows a schematic cross-section of gas turbine engine 10. Gas turbine engine 10 includes low pressure spool 12, high pressure spool 14 and fan drive gear system ("FDGS") 16. Low pressure spool 12 includes low pressure compressor 18 and low pressure turbine 20, which are connected by low pressure shaft 22. High pressure spool 14 includes high pressure compressor 24 and high pressure turbine 26, which are connected by high pressure shaft 28. Fan drive gear system 16 includes epicyclic gear train 30 that drives a fan assembly 32 by way of a carrier shaft 34. Epicyclic gear train 30 includes sun gear 36, ring gear 38 and planetary gears 40 as will be shown hereinbelow. A carrier 50 is shown schematically in FIG. 4 between shaft 34 and ring gear 38. Details of this connection are better shown in FIG. 2.

Low pressure spool 12 and high pressure spool 14 are covered by engine nacelle 42, and fan assembly 32 and nacelle 42 are covered by fan nacelle 44. Low pressure spool 12, high pressure spool 14 and fan assembly 32 comprise a two-and-a-half spool gas turbine engine in which epicyclic gear train 30 couples fan assembly 32 to low pressure spool 12 with input shaft 46.

Fan assembly 32 generates bypass air for producing thrust that is directed between engine nacelle 42 and fan nacelle 44, and core air that is directed into engine nacelle 42 for sequential compression with low pressure compressor 18 and high pressure compressor 24. Compressed core air is routed to combustor 48 wherein it is mixed with fuel to sustain a combustion process. High energy gases generated in combustor 48 are used to turn high pressure turbine 26 and low pressure turbine 20. High pressure turbine 26 and low pressure turbine 20 rotate high pressure shaft 28 and low pressure shaft 22 to drive high pressure compressor 24 and low pressure compressor 18, respectively. Low pressure shaft 22 also drives input shaft 46, which connects to epicyclic gear train 30 to drive fan assembly 32.

Figure 2:
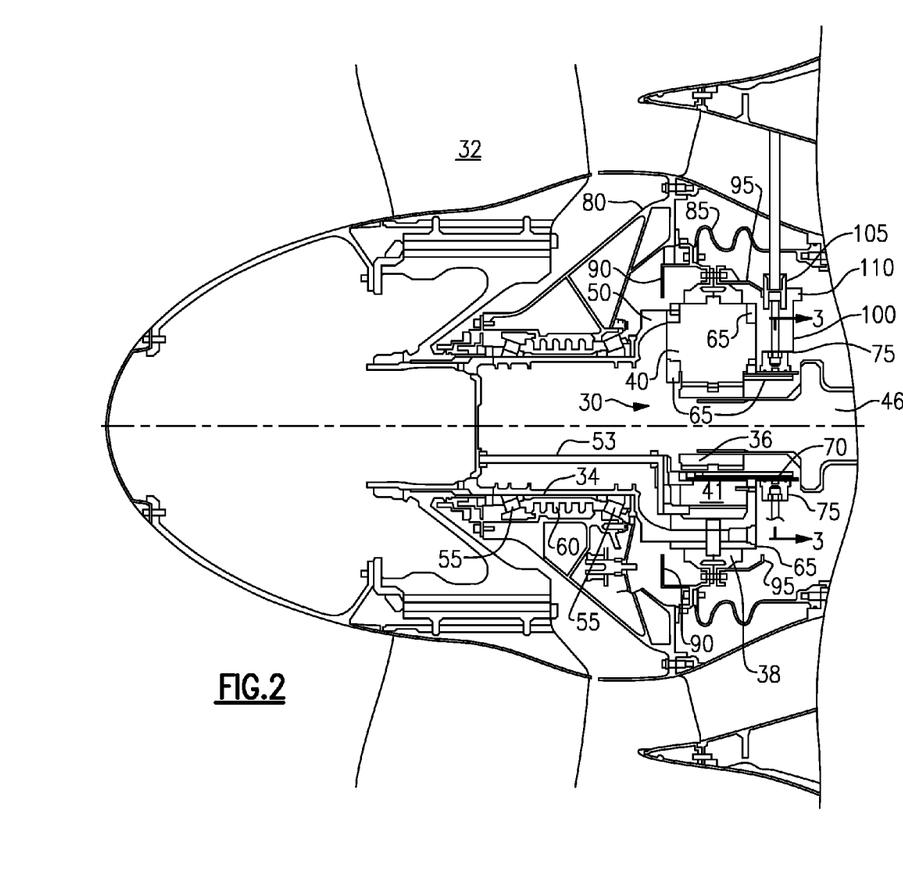
FIG. 2 is a sectional view taken along the lines 2-2 in FIG. 1.
Figure 2A:
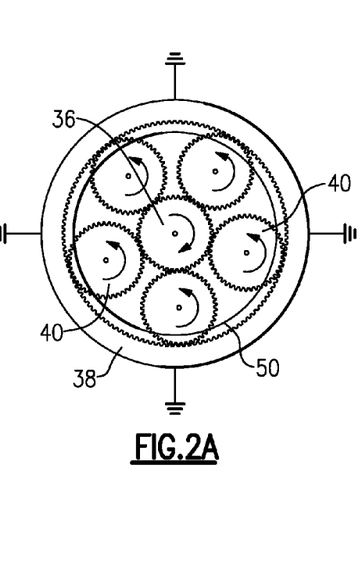
FIG. 2A is a sectional view through the gear drive.

Referring now to FIG. 2 and FIG. 2A, a view of the planetary gear system having exemplary oil supply system is shown. The system is comprised of a input shaft 46, sun gear 36 attaching thereto a plurality of planetary gears 40 that rotate about the sun gear 36, stationary ring gear 38, and a carrier 50 that rotates about the star gear to drive the fan assembly 32. As the ring gear 38 is stationary, the rotation of the sun gear 36 causes each planetary gear 40 to counter-rotate relative to the direction of rotation of the sun gear 36 and simultaneously to orbit the sun gear 36 in the direction of the sun gear's rotation. In other words, whereas each planetary gear 40 individually counter-rotates relative to the sun gear 36, the group of planetary gears 40 co-rotates with the sun gear 36. Moreover, as the carrier 50 is driven by the rotation of the group of planetary gears 40, the carrier 50 also co-rotates with respect to the sun gear 36. Finally, as the fan 32 is driven by the carrier 50 (via shaft 34), the fan 32 also co-rotates with respect to the sun gear 36 and the low spool shaft 46. Thus, in this embodiment, the fan 32 rotates in the same direction as the low pressure compressor 18.

A first spray bar 41 is mounted to the carrier 50 in between each planetary gear 40 that lubricates the planet gears 40 and ring gear 38. A second spray bar 53 is attached to the first spray bar 41 and extends forward to provide lubrication to the carrier shaft 34 that is supported by tapered bearings 55 that are tensioned by spring 60.

The carrier 50 has a shaft 34 for driving the fan assembly 32, a circular body 65 for holding the planetary gears 40 and a cylinder 70 projecting aft about the input shaft 46. The cylinder 70 also closely interacts with a stationary oil transfer bearing 75.

A grounding structure 80 holds the FDGS 16, the ring gear 38, forward gutter 90 and aft gutter 95. The flexible coupling 85 is disposed around the rotary input shaft 46. The forward gutter 90 and an aft gutter 95 attach to and around the outer edge of the ring gear 38 to collect oil used by the system for reuse as will be discussed herein. Oil is input through the stationary oil transfer bearing 75 to the cylinder 70 (e.g. also a bearing) as will be discussed herein.

Figure 3:
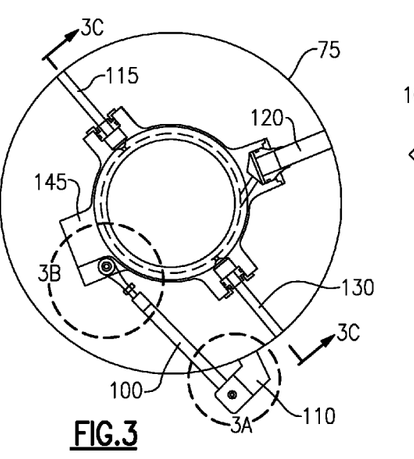
FIG. 3 is a sectional view taken along the lines 3-3.

Referring now to FIG. 3, a side, sectional view of the oil transfer bearing 75 is shown. The oil transfer bearing 75 is prevented from rotational movement by attachment of a link 100 via tab 110 to an oil input coupling 105 that attaches to the stationary aft gutter 95 (see also FIG. 2).

The oil transfer bearing 75 has a plurality of inputs to provide oil to those portions of the FDGS 16 that require lubrication during operation. For instance, oil from tube 115 is intended to lubricate the tapered bearings 55, oil from tube 120 is intended to lubricate the planet gear bearings 125 (see FIG. 5), and oil from tube 130 is intended to lubricate the planet and ring gears, 38, 40. Though three inputs are shown herein, other numbers of oil inputs are contemplated herein.

Figure 3A:
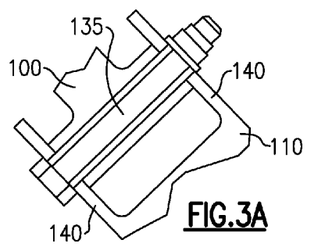
FIG. 3A is a sectional view taken along the line A-A of FIG. 3.
Figure 3B:
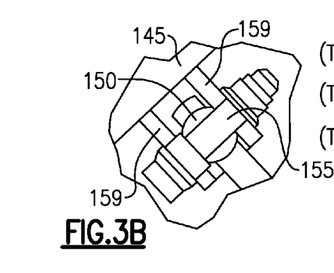
FIG. 3B is a sectional view taken along the line B-B of FIG. 3.

Referring now to FIGS. 3A and 3B, the link 100 attaches via a pin 135 to the ears 140 extending from the tab 110. The link 100 extends towards a boss 145 on the oil transfer bearing 75 and is attached thereto by a ball 150 and a pin 155 extending through the ball and a pair of ears 159 on the boss 145 on the oil transfer bearing 75. The ball 150 allows the oil transfer bearing 75 to flex with the rotary input shaft 46 as torqueing moments are experienced by the fan assembly 32 and other portions of the engine 10. The link 100 prevents the oil transfer bearing 75 from rotating while allowing it to flex.

Figure 3C:
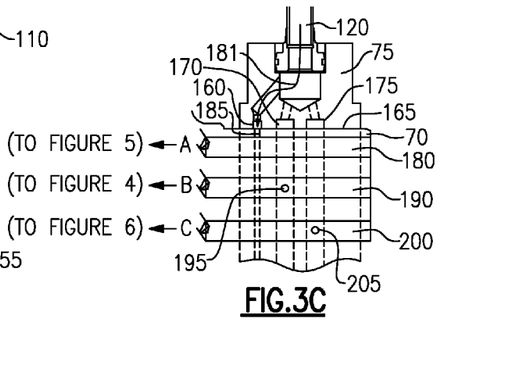
FIG. 3C is a sectional view taken along the line C-C FIG. 3.

Referring now to FIG. 3C, a cross-sectional view of the oil transfer bearing 75 is shown. The oil transfer bearing has a first race 160 that has a rectangular shape and extends around the interior surface 165 of the oil transfer bearing 75, a second race 170 that has a rectangular shape and extends around the interior surface 165 of the oil transfer bearing 75 and a third race 175 that has a rectangular shape and extends around the interior surface 165 of the oil transfer bearing 75. In the embodiment shown, tube 120 inputs oil via conduit 181 into the first race 160.

Cylinder 70 which extends from the carrier circular body 65, has a first oil conduit 180 extending axially therein and communicating with the first race 160 via opening 185, a second oil conduit 190 extending axially therein and communicating with the second race 170 via opening 195 and a third oil conduit 200 extending axially therein and communicating with the third race 175 via opening 205. As the cylinder 70 rotates within the oil transfer bearing 75, the openings 185, 195, 205 are constantly in alignment with races 160, 170, 175 respectively so that oil may flow across a rotating gap between the oil transfer bearing 75 and the cylinder 65 through the openings 185, 195, 205 to the conduits 180, 190, 200 to provide lubrication to the areas necessary in engine 10. As will be discussed herein, oil from conduit 180 flows through pathway A, oil from conduit 190 flows through pathway B and oil from conduit 200 flows through pathway C as will be shown herein.

Figure 4:
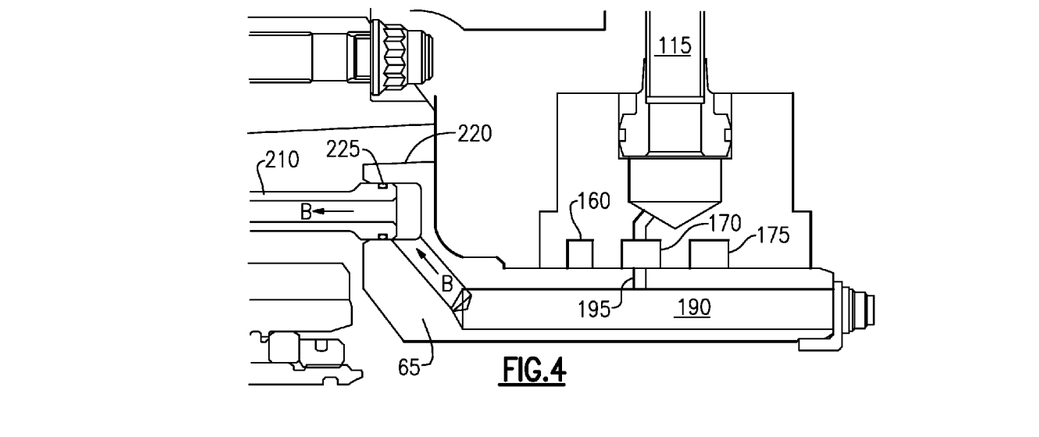
FIG. 4 is a sectional view of a portion of oil flow path A.
Figure 6:
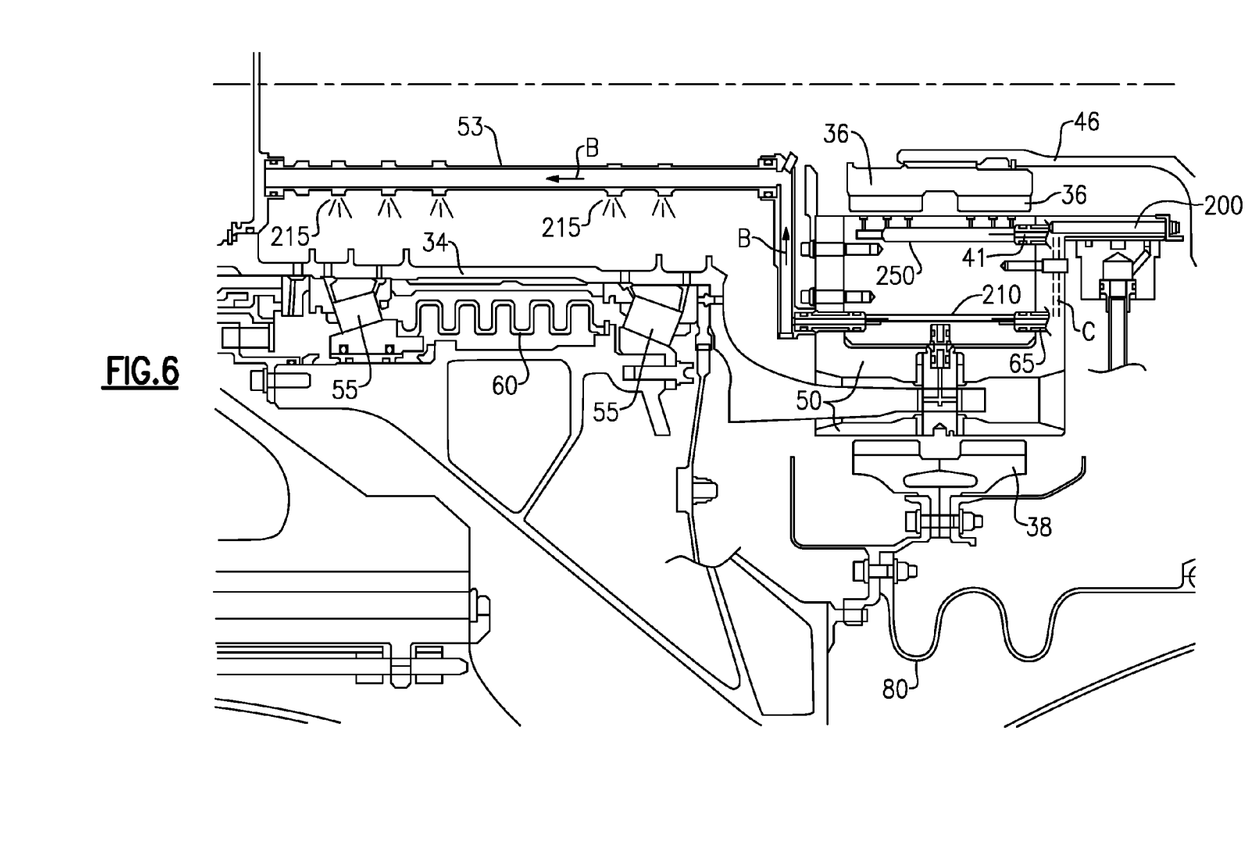
FIG. 6 is a sectional view of a lower portion of the planetary gear system of FIG. 1.

Referring now to FIGS. 4 and 6, oil from the tube 115 flows into second race 170, through opening 195 into conduit 190. From conduit 190, the oil flows through path B into a pipe 210 in the first spray bar 41 to the second spray bar 53 where it is dispersed through nozzles 215. Pipe 210 is mounted into fixtures 220 in the circular body 65 by o-rings 225 the oil FIG. 4, the journal oil bearing input passes through tube, and tube into transfers tubes through tube into the interior of each planetary gear. Each planetary gear has a pair of transverse tubes communicating with the interior of the planetary journal bearing to distribute oil between the planetary gear and the ring gear and a set of gears to provide lubricating area oil to the journal bearings 235 themselves.

Figure 5:
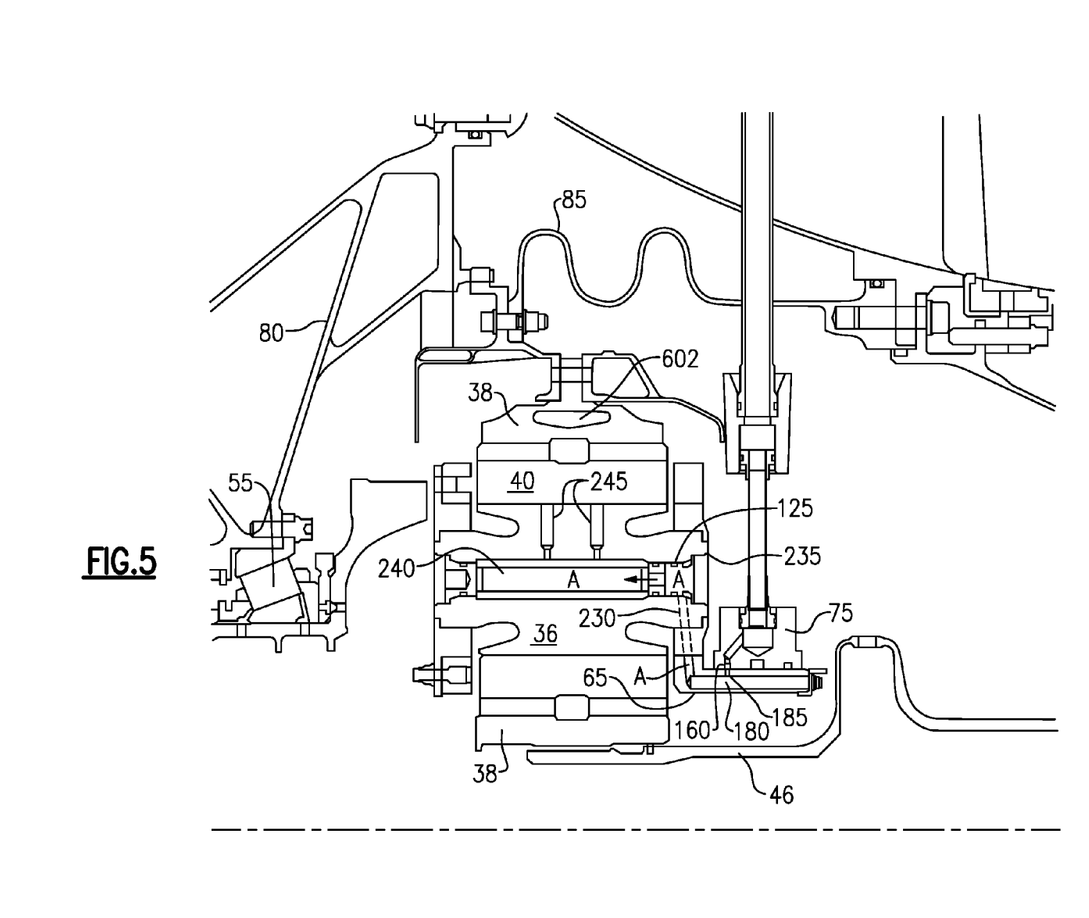
FIG. 5 is a sectional view of an upper portion of the planetary gear system of FIG. 1.

Referring now to FIGS. 3C and 5, the flow of oil through path A is shown. The oil leaves conduit 180 through tube 230 and flows around journal bearings 235 that support the planet gear 40 and into the interior of shaft 240. Oil then escapes from the shaft 240 through openings 245 to lubricate between the planetary gears 40 and the ring gear 38.

Referring to FIG. 6, the conduit 200 provides oil through pathway C into manifold 250 in the first spray bar 41 which sprays oil through nozzles 215 on the sun gear.

Figure 7:
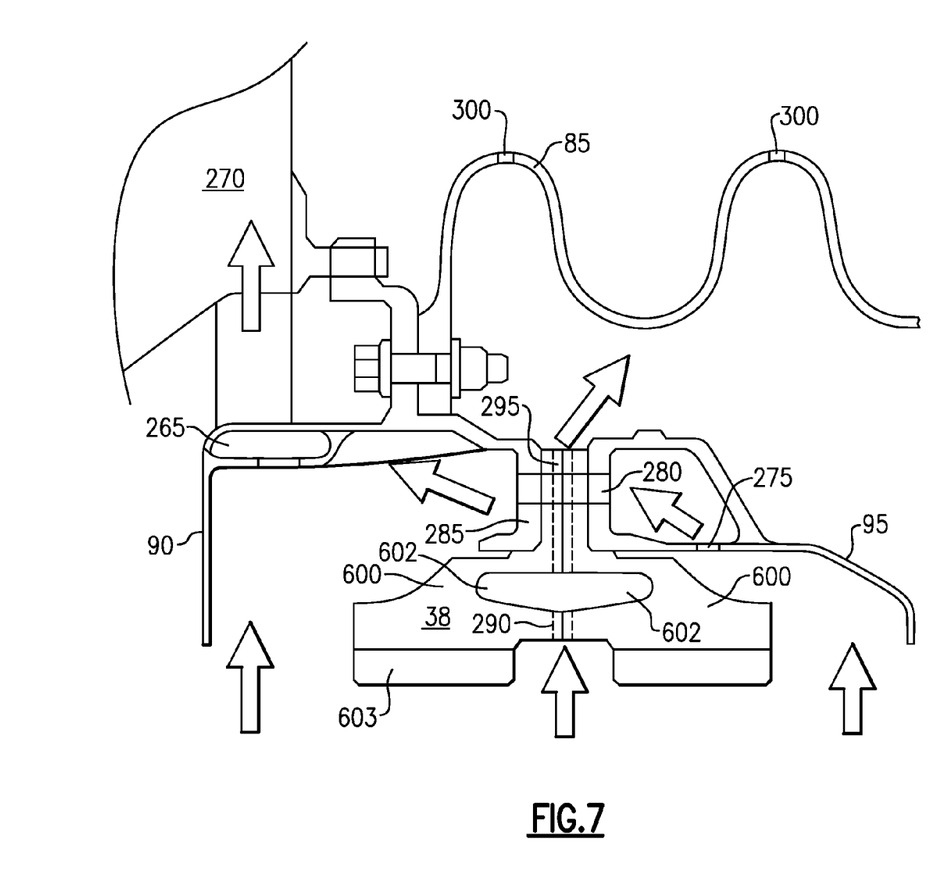
FIG. 7 is a sectional view of a flow of oil into gutters.

Referring now to FIG. 7, oil drips (see arrows) from the planetary gears 40 and the sun gear 36 about the carrier 50 and is trapped by the forward gutter 90 and the aft gutter 95. Oil captured by the forward gutter 90 is collected through scupper 265 for transport into an auxiliary oil tank 270. Similarly, oil captured by the aft gutter 95 travels through opening 275 and opening 280 in the ring gear support 285 into the forward gutter 90 to be similarly collected by the scupper 265 to go to the auxiliary oil tank 270. Some oil passes through openings 290, 295 within the ring gear 38 and drips upon the flexible coupling 85 and migrates through holes 300 therein and drains to the main scavenge area (not shown) for the engine 10.

As is clear from FIGS. 5 and 7, there is a recess adjacent the outer periphery of the ring gear 38. The recess identified by 602, can be seen to be formed by half-recess portions in each of two separate gear portions 600 which form the ring gear 38. As is clear, the recess 602 is radially outwardly of the gear teeth 603 on the ring gear 38. This recess helps balance force transmitted through the ring gear as the various interacting gear members shift orientation relative to each other.

Referring now to the Figures, In view of these shortcomings a simple, reliable, unlubricated coupling system for connecting components of an epicyclic gear train 30 to external devices while accommodating misalignment therebetween is sought.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a fan, a first compressor stage and a second compressor stage;
   a first turbine stage and a second turbine stage, and wherein said first turbine stage drives said second compressor stage as a high spool, and wherein said second turbine stage drives said first compressor stage as part of a low spool;
   a gear train driving said fan with said low spool, and such that said fan and said first compressor stage rotate in the same direction, and wherein said high spool operates at higher pressures than said low spool;
   a first spray bar providing lubrication to said gear train; and
   a second spray bar extending from said first spray bar and providing lubrication to said gear train.

2. The gas turbine engine of claim 1, further comprising said gear train having a planetary gear, a sun gear, a stationary ring gear, a carrier in which said planetary gear is mounted, and said carrier mounted for rotation about said sun gear and driving said fan.

3. The gas turbine engine of claim 2, wherein said ring gear has a recess.

4. The gas turbine engine of claim 3, wherein said recess is radially outward of gear teeth on said ring gear.

5. The gas turbine engine of claim 4, wherein said recess is formed by recess portions formed in each of two gear portions which together form said ring gear.

6. The gas turbine engine of claim 2, wherein said first spray bar provides lubrication to said plurality of planetary gears and to said ring gear.

7. The gas turbine engine of claim 6, wherein said second spray bar provides lubrication to a shaft of said carrier.

8. The gas turbine engine of claim 7, wherein lubrication flows from said first spray bar to said second spray bar.

9. The gas turbine engine of claim 7, wherein said shaft of said carrier drives said fan.

10. The gas turbine engine of claim 2, wherein each of the plurality of planetary gears counter-rotates relative to a direction of rotation of said sun gear and simultaneously orbits said sun gear in the direction of rotation of the sun gear so as to co-rotate said carrier with said sun gear and said low spool.

11. The gas turbine engine of claim 2, wherein a lubricating system is provided for said gear train.

12. The gas turbine engine of claim 11, wherein the lubricating system includes a lubricant input, there being a stationary first bearing receiving lubricant from said lubricant input, said first bearing having an inner first race in which lubricant flows, and a second bearing for rotation within said first bearing, said second bearing having a first opening in registration with said inner first race such that lubricant may flow from said inner first race through said first opening into a first conduit.

13. The gas turbine engine of claim 12, wherein said second bearing extends from said carrier about an axis.

14. The gas turbine engine of claim 12, wherein said first conduit lubricates said planetary gears.

15. The gas turbine engine of claim 14, wherein the first spray bar is disposed on said carrier.

16. The gas turbine engine of claim 12, wherein said first bearing includes a second race extending around an interior surface of said first bearing, and lubrication flows from said second race to said first spray bar.

17. The gas turbine engine of claim 16, wherein lubrication flows from said second bearing to said first spray bar via a pipe mounted on a circular body of said carrier, said circular body holding said plurality of planetary gears.

18. The gas turbine engine of claim 1, wherein the fan rotates slower than the first compressor stage.

* * * * *